United States Patent
Zhang et al.

(10) Patent No.: US 7,553,575 B2
(45) Date of Patent: Jun. 30, 2009

(54) FUEL CELL HUMIDIFICATION SYSTEM AND METHOD

(75) Inventors: Jianbo Zhang, Yokosuka (JP); Atsushi Miyazawa, Yokosuka (JP)

(73) Assignee: Nissan Motor Co., Ltd., Kanagawa (JP)

(*) Notice: Subject to any disclaimer, the term of this patent is extended or adjusted under 35 U.S.C. 154(b) by 974 days.

(21) Appl. No.: 10/352,116

(22) Filed: Jan. 28, 2003

(65) Prior Publication Data
US 2003/0157392 A1  Aug. 21, 2003

(30) Foreign Application Priority Data
Feb. 15, 2002  (JP)  ............... 2002-038043

(51) Int. Cl.
  *H01M 8/02*  (2006.01)
  *H01M 8/04*  (2006.01)
  *G01N 19/10*  (2006.01)
(52) U.S. Cl. .............. 429/34; 429/13; 429/22; 204/409; 204/196.03
(58) Field of Classification Search ............ 429/12, 429/13, 22, 38, 39
See application file for complete search history.

(56) References Cited

U.S. PATENT DOCUMENTS

| | | | |
|---|---|---|---|
| 5,853,910 A | 12/1998 | Tomioka et al. | |
| 5,935,726 A * | 8/1999 | Chow et al. | 429/13 |
| 6,322,914 B1 | 11/2001 | Chow et al. | |
| 6,589,678 B1 * | 7/2003 | McElroy | 429/13 |
| 2002/0009623 A1 * | 1/2002 | St-Pierre et al. | 429/13 |

FOREIGN PATENT DOCUMENTS

| | | |
|---|---|---|
| DE | 199 29 472 | 12/2000 |
| JP | 53-110888 | 9/1978 |
| JP | 63-110555 | 5/1988 |
| JP | 3-236115 | 10/1991 |
| JP | 03236115 A * | 10/1991 |
| JP | 5-343082 | 12/1993 |
| JP | 6-69818 | 9/1994 |
| JP | 11-162490 | 6/1999 |
| JP | 11162490 A * | 6/1999 |
| JP | 2000-009635 | 1/2000 |
| JP | 2000009635 A * | 1/2000 |
| JP | 2000-251910 | 9/2000 |
| JP | 2000-323159 | 11/2000 |
| JP | 2001-15136 | 1/2001 |
| JP | 2001-155759 | 6/2001 |
| JP | 2001-525596 A | 12/2001 |
| WO | WO 01/61775 | 8/2001 |

* cited by examiner

*Primary Examiner*—Patrick Ryan
*Assistant Examiner*—K. Walker
(74) *Attorney, Agent, or Firm*—McDermott Will & Emery LLP

(57) ABSTRACT

One end of an air passage (32) facing a cathode (33B) of a fuel cell (36) forming a fuel cell stack (6) is connected to a first manifold (1A), and the other end is connected to a second manifold (1B). A water-absorbing material (30) is disposed at a position in contact with an air flow in the first manifold (1A) and second manifold (1B). The air is made to circulate according to a humidity state by changing over between a first air flow direction wherein air flows from the first manifold (1A) to the second manifold (1B) via the air passage (32), and a second air flow direction wherein air flows from the second manifold (1B) to the first manifold (1A) via the air passage (32), so a membrane electrolyte is efficiently humidified.

4 Claims, 13 Drawing Sheets

FUEL CELL HUMIDIFICATION SYSTEM AND METHOD

FIELD OF THE INVENTION

This invention relates to humidification of a membrane electrolyte in a fuel cell.

BACKGROUND OF THE INVENTION

When a polymer electrolyte fuel cell (PDFC) generates power, if the membrane electrolyte dries out, the ionic conductivity falls, so a resistance overvoltage increases and the power generating efficiency falls. Conversely, if the water in a gas diffusion layer situated on both sides of the membrane electrolyte is excessive, it interferes with the diffusion of reactive gases to the electrodes of the fuel cell, so a diffusion overvoltage increases and the power generating efficiency again falls. Herein, the reactive gas is air for the cathode and hydrogen for the anode. In the air, only the oxygen is used for reaction.

To supply a suitable amount of water to the membrane electrolyte, Tokkai 2000-323159 published by the Japanese Patent Office in 2000 discloses a frame-shaped water-absorbing sheet surrounding the cathode and joined to the membrane electrolyte. At the cathode, water is produced by the reaction of hydrogen ions which have passed through the membrane electrolyte and oxygen in the air. When the water-absorbing sheet adsorbs and holds this water, the membrane electrolyte and air supplied to the fuel cell from outside is humidified. By humidifying the membrane electrolyte, water which has passed through the membrane electrolyte also humidifies hydrogen supplied to the anode on the other side of the membrane electrolyte.

SUMMARY OF THE INVENTION

The water-absorbing sheet absorbs water at a downstream portion of the gas passage facing the cathode, and the absorbed water moves through the interior of the water-absorbing sheet to humidify fresh air which has flowed into the gas passage at an upstream portion of the gas passage. The reason why the absorbed water moves in the water-absorbing sheet is because a difference arises in the water content of the water-absorbing sheet, and if this water content gradient is not sufficiently sharp, a desirable water mobility rate is not obtained.

Further, when the water content of the downstream portion of the water-absorbing sheet is close to saturated, the water absorption efficiency falls. In this state, a large amount of water is discharged outside the fuel cell as a part of cathode effluent.

Due to this situation, it is difficult to obtain a water content sufficient to humidify the membrane electrolyte with the water-absorbing sheet alone.

It is therefore an object of this invention to enhance the efficiency of a water absorption-humidification cycle in the humidification mechanism of a membrane electrolyte using a water-absorbing material such as a water-absorbing sheet.

In order to achieve the above object, this invention provides a fuel cell power plant comprising a fuel cell stack wherein plural fuel cells are stacked in series, and each of the fuel cells comprises a membrane electrolyte, an electrode in contact with the membrane electrolyte, and a gas passage formed facing the electrode. The power plant generates power by a chemical reaction of a gas flowing in the gas passage at the electrode.

The power plant further comprises a first manifold communicating with an end of each of the gas passages, a second manifold communicating with the other end of each of the gas passages, and a gas supply mechanism. Both the first manifold and the second manifolds comprise a water-absorbing material facing a flow of the gas, and the gas supply mechanism has a function to selectively change over between a first gas supply direction wherein the gas is made to flow from the first manifold to the second manifold via the gas passages, and a second gas supply direction wherein the gas is made to flow from the second manifold to the first manifold via the gas passages, so as to supply the gas to the fuel cells.

It is preferable that the power plant further comprises a sensor which detects a parameter relating to a humidity in the gas passages and a controller functioning to determine whether or not the parameter satisfies a predetermined condition, and control the gas supply mechanism to change over the gas supply direction when the parameter does not satisfy the predetermined condition.

This invention also provides a gas supply direction control method for the above-described power plant, comprising detecting a parameter relating to a humidity in the gas passages, determining a parameter relating to a humidity in the gas passages, and controlling the gas supply mechanism to change over the gas supply direction when the parameter does not satisfy the predetermined condition.

The details as well as other features and advantages of this invention are set forth in the remainder of the specification and are shown in the accompanying drawings.

DESCRIPTION OF THE PREFERRED EMBODIMENTS

A first embodiment of this invention will be described referring to the FIGS. 1-5 of the drawings.

Figure 1:
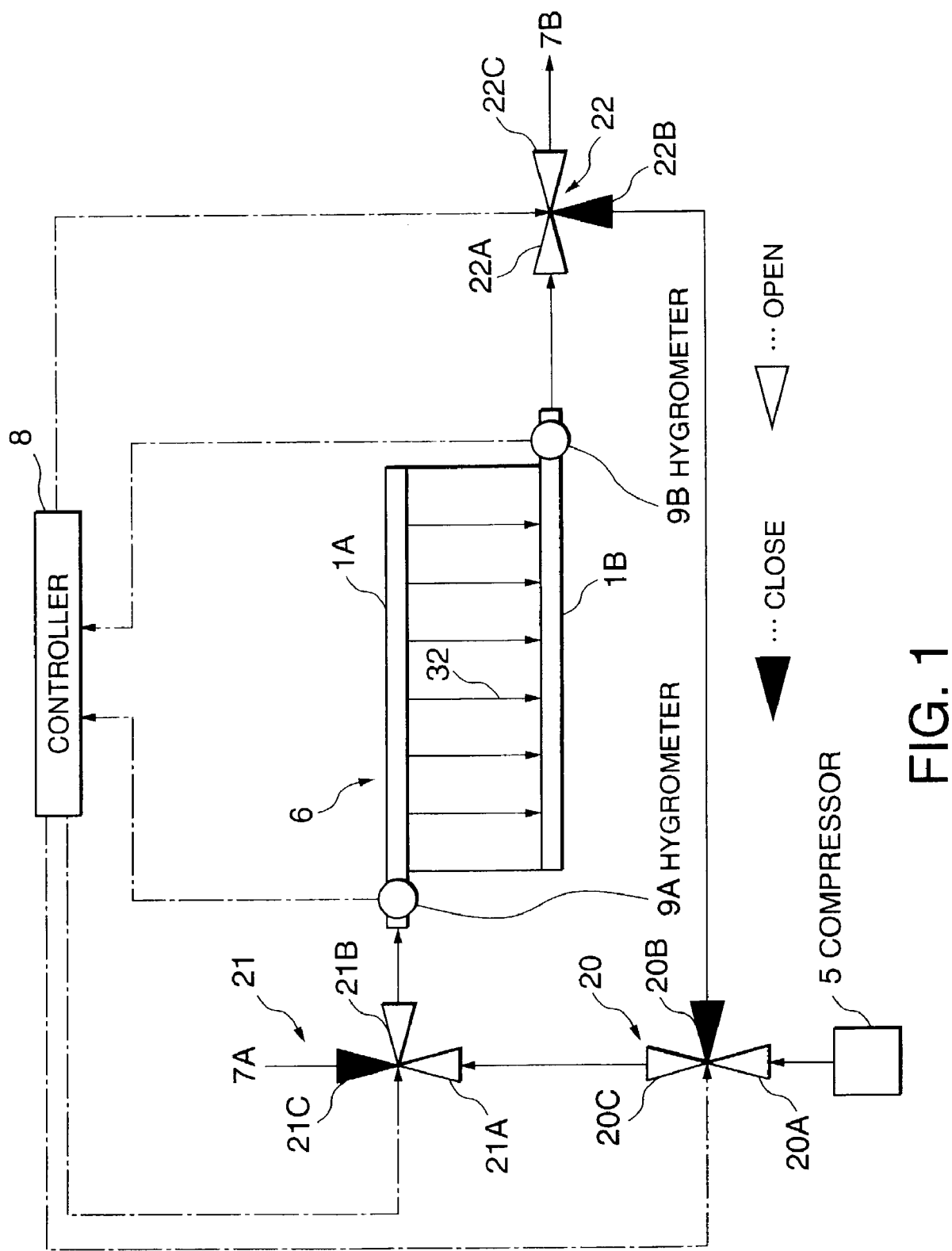
FIG. 1 is a schematic diagram showing an air supply mechanism of a fuel cell stack according to a first embodiment of this invention.

Referring to FIG. 1, an air supply mechanism for a fuel cell stack 6 according to this invention supplies air from a compressor 5 to an air passage 32 formed inside the fuel cell stack 6, three-way valve 20, and one of three-way valves 21, 22. The three-way valve 20 comprises a port 20A connected to the compressor 5, a port 20B connected to the three-way valve 22, and a port 20C connected to the three-way valve 21. The three-way valve 20 makes the port 20A communicate with one of the port 20B and port 20C according to an output signal from a controller 8.

The three-way valve 21 comprises a port 21A connected to the port 20C of the three-way valve 20, a port 21B connected to an air manifold 1A fitted to the fuel cell stack 6, and a port 21C connected to a discharge pipe 7A which opens to the atmosphere. The three-way valve 21 makes the port 21B communicate with one of the ports 21A and 21C according to an output signal from the controller 8.

The three-way valve 22 comprises a port 22A connected to an air manifold 1B fitted to the fuel cell stack 6, a port 22B connected to the port 20B of the three-way valve 20, and a port 22C connected to a discharge pipe 7B which opens to the atmosphere. The three-way valve 22 makes the port 22A communicate with one of the ports 22B and 22C according to an output signal from the controller 8.

Figure 3:
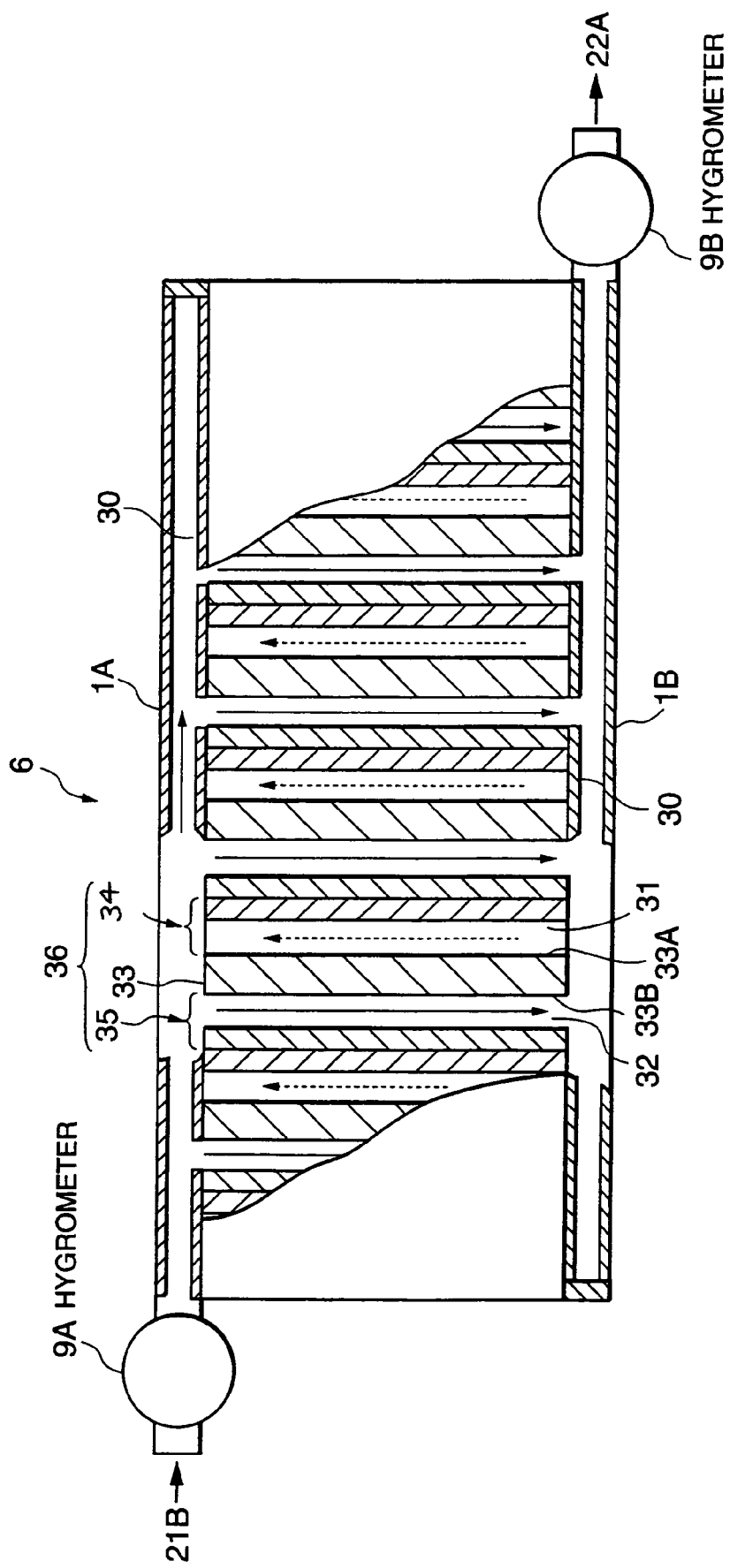
FIG. 3 is a schematic diagram of a fuel cell stack air passage including a partial longitudinal cross sectional view of the fuel cell stack.

Next, referring to FIG. 3, the fuel cell stack 6 is a stacked structure comprising a large number of fuel cells 36 stacked in series. Each fuel cell 36 comprises a membrane electrolyte 33 having an anode 33A and cathode 33B on either side, and an anode gas separator 34 and cathode gas separator 35 formed of an electrically conductive material disposed outside the anode 33A and cathode 33B so as to grip them.

A hydrogen passage 31 facing the anode 33A is formed inside the anode gas separator 34. An air passage 32 facing the cathode 33B is formed inside the cathode gas separator 35. Therefore, a large number of the hydrogen passages 31 and air passages 32 are formed inside the fuel cell stack 6 which is a stack of the single fuel cells 36. The solid arrows in the diagram show the air flow, and the broken arrows show the hydrogen flow.

One end of the air passages 32 is connected to the air manifold 1A, and the other end is connected to the air manifold 1B. Due to this arrangement, air supplied to one of the air manifolds 1A(1B) is supplied to the cathode 33B by the air passage 32 of each of the fuel cells 36.

Although not shown in this diagram, one end of the hydrogen passages 31 is connected to a hydrogen manifold, and the other end of the hydrogen passages 31 is connected to another hydrogen manifold as in the case of the air passage 32. Hydrogen is supplied to one of the two hydrogen manifolds, and consequently supplied to the anode 33A via the hydrogen passage 31 of each of the fuel cells 36. Anode effluent resulting from completion of the electrochemical reactions at the anode 33A is discharged from the hydrogen passages 31 to the other hydrogen manifold.

Hydrogen supplied to the anode 33A passes through the membrane electrolyte 33 as hydrogen ions, and produces water vapor by combining with oxygen in air supplied to the cathode 33B. As a result, cathode effluent which is a gaseous mixture of the residual components of air after consumption of oxygen and water vapor thus produced is discharged from the cathode 33B to the other air manifold 1B (1A) via the air passage 32.

The inner peripheries of the air manifolds 1A, 1B are respectively covered by a water-absorbing material 30. An organic water-absorbing material such as a water-absorbing polymer resin, fibrous paper or cloth, or an inorganic water-absorbing material such as silica gel or alumina gel, is used as the water-absorbing material 30. Apart from covering the inner peripheries of the air manifolds 1A, 1B with the water-absorbing material 30, the air manifolds 1A, 1B may have a honeycomb cross section, and the water-absorbing material 30 may be fitted to the honeycomb wall surface. Unlike the water-absorbing sheet of the aforesaid prior art example, the water-absorbing material 30 does not necessarily have to be continuous. Therefore, the water-absorbing material 30 may also be provided as a filter-shaped block which cuts across the air flow in the air manifolds 1A, 1B. However, the water-absorbing material 30 must be provided in both of the air manifolds 1A, 1B.

As described above, one end of the air manifold 1A is connected to the port 21B of the three-way valve 21, and the other end is closed. As described above, one end of the air manifold 1B is connected to the port 22A of the three-way valve 22, and the other end is closed.

Now, referring again to FIG. 1, a black arrow in the diagram shows that the corresponding port is closed, and a white arrow shows that the corresponding port is open. Taking the three-way valve 20 as an example, the port 20B is closed and the port 20C is open, i.e., the port 20A communicates with the port 20C. Likewise, in the three-way valve 21, the port 21A communicates with the port 21B, and the port 21C is closed. In the three-way valve 22, the port 22C communicates with the port 22A, and the port 22B is closed. In this state, air supplied by the compressor 5 is supplied to the air manifold 1A via the three-way valves 20, 21. Also, cathode effluent from the cathode 33B is discharged to the air manifold 1B, and discharged to the atmosphere from the discharge pipe 7B via the three-way valve 22. The air flow direction when the three-way valves 20-22 are in the positions shown in FIG. 1, will be referred to as a first air supply direction in the following description.

Figure 2:
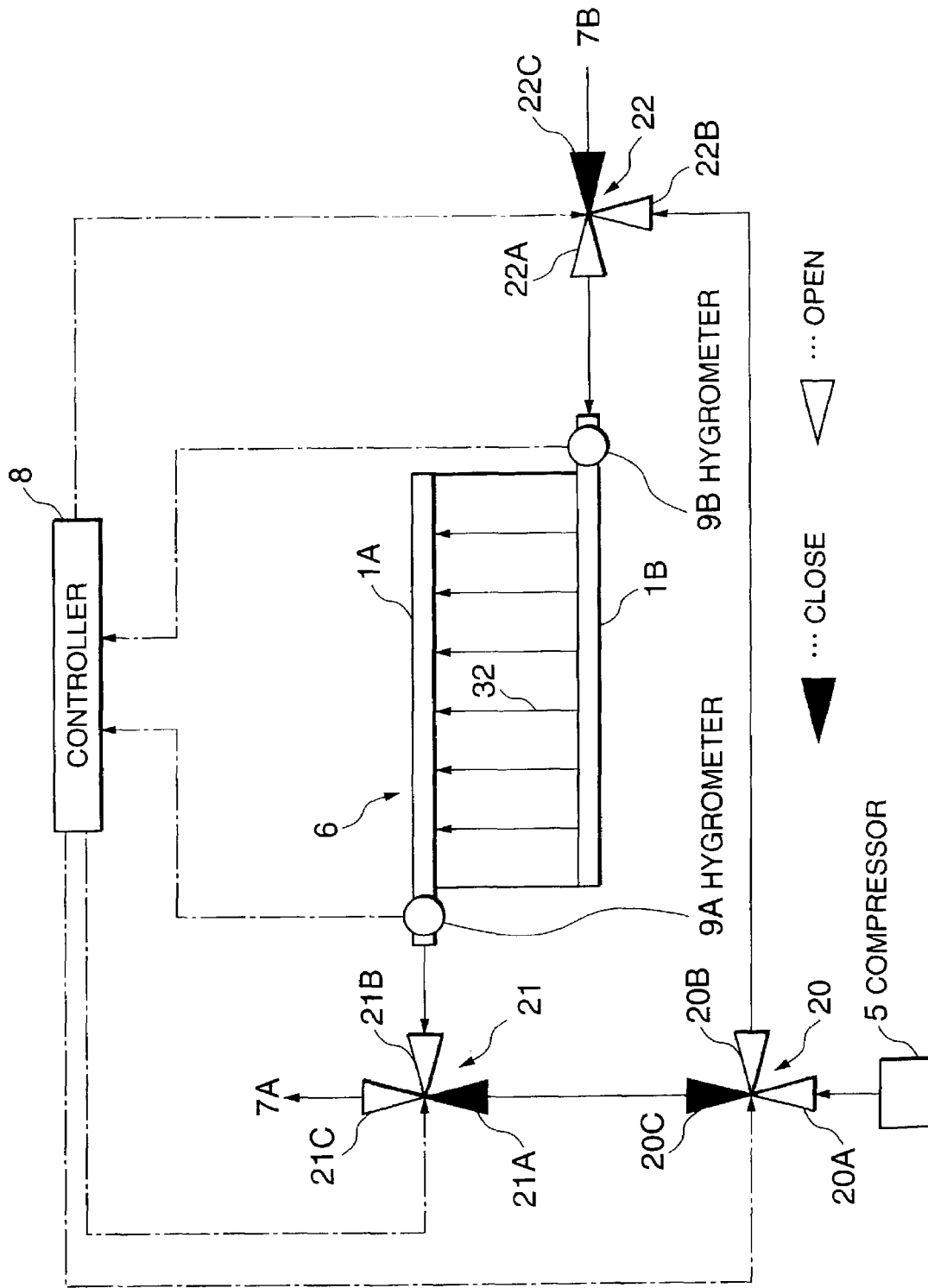
FIG. 2 is similar to FIG. 1, but showing the case where the air supply direction is reversed.

Referring to FIG. 2, the three-way valve 20 makes the port 20B communicate with the port 20A, and closes the port 20C. The three-way valve 21 makes the port 21C communicate with the port 21B, and closes the port 21A. The three-way valve 22 makes the port 22B communicate with the port 22A, and closes the port 22C. In this state, the air supplied by the compressor 5 is supplied to the air manifold 1B via the three-way valves 20, 22. Also, cathode effluent discharged from the cathode 33B to the air manifold 1A, is discharged to the atmosphere from the discharge pipe 7A via the three-way valve 21. The air flow direction when the three-way valves 20-22 are in the positions shown in FIG. 2, will be referred to as a second air supply direction in the following description.

When the air is flowing in the first air supply direction, and the fuel cell stack 6 is operated in this state, air supplied from the compressor 5 to the air manifold 1A via the three-way valves 20, 21, is distributed to the air passages 32 in the fuel cells 36. At the cathode 33B facing the air passage 32, the oxygen in this air generates water vapor due to reaction with hydrogen ions from the anode 33A which have passed through the membrane electrolyte 33. This water vapor humidifies the membrane electrolyte 33, mixes with components of the air apart from the oxygen consumed in the reaction, and is discharged as cathode effluent from the air passage 32 to the air manifold 1B. Therefore, the cathode effluent contains a large amount of water vapor. This water vapor is absorbed by the water-absorbing material 30 disposed in the air manifold 1B. After some of the water vapor is absorbed by the water-absorbing material 30, the cathode effluent is discharged to the atmosphere from the discharge pipe 7B via the three-way valve 22.

When the water-absorbing material 30 in the air manifold 1B has absorbed sufficient water, the air supply direction is changed over from the first air supply direction to the second air supply direction, so that air from the compressor 5 is applied to the air manifold 1B. The air supplied to the air manifold 1B is humidified by coming in contact with the water-absorbing material 30 which has absorbed water. The humidified air is distributed to the air passages 32 in the fuel cells 36, and reaches the cathode 33B. At the cathode 33B, water vapor is produced due to reaction of oxygen with hydrogen ions. Due to the water vapor produced and the water in the humidified air, the membrane electrolyte 33 is well humidified. At the same time, cathode effluent discharged from the air passages 32 to the air manifold 1A contains a large amount of water. This water is absorbed by the water-absorbing material 30 disposed in the air manifold 1A. After the water vapor is absorbed by the water-absorbing material 30, the cathode effluent is discharged to the atmosphere from the discharge pipe 7A via the three-way valve 21.

In other words, water in cathode effluent discharged from the air manifolds is absorbed by the water-absorbing material 30, and when the air supply direction is changed over, air supplied from outside to the same air manifold is humidified by water absorbed by the water-absorbing material 30. Therefore, the water content of the water-absorbing material 30 in contact with cathode effluent increases as operation of the fuel cell stack continues. At the same time, the water content of the water-absorbing material 30 in contact with air supplied from outside, decreases as operation of the fuel cell stack continues.

In this situation, the controller 8 operates the three-way valves 20-22 to change over between the first air supply direction and second air supply direction according to the humidity of the air distributed to the air passages 32, so that the humidity of the air supplied to the air passages 32 is maintained within a suitable range, and a correct amount of water is always supplied to the membrane electrolyte 33.

In this embodiment, an index showing the humidity of the air distributed to the air passages 32 is obtained from a first hygrometer 9A installed at one end of the air manifold 1A leading to the port 21B, and a second hygrometer 9B installed at one end of the air manifold 1B leading to the port 22B.

The humidities detected by the hygrometers 9A, 9B are respectively input as signals to the controller 8.

Figure 4:
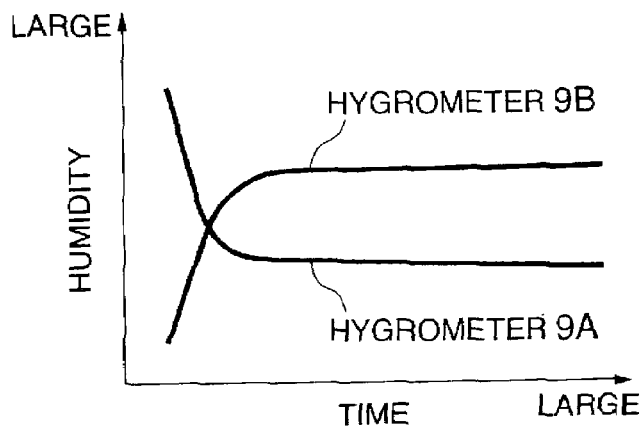
FIG. 4 is a timing chart describing the variation of humidity sensor measurement values according to the first embodiment of this invention.

FIG. 4 shows the humidity detected by the hygrometers 9A, 9B with elapsed time when the air supply direction is changed over from the second air supply direction to the first air supply direction during operation of the fuel cell stack 6. The air supplied to the air manifold 1A after air supply direction change-over, is mainly humidified by the water-absorbing material 30 near the inlet of the air manifold 1A immediately following the change-over. When the water content of the water-absorbing material 30 near the inlet falls with elapsed time, air supplied to the air manifold 1A is humidified by the water in the water-absorbing material 30 situated at a distance from the inlet. Thus, the water content of the water-absorbing material 30 disposed in the vicinity of the inlet of the air manifold 1A falls earlier than the water content of the water-absorbing material 30 disposed in the other part. The humidity detected by the first hygrometer 9A disposed at the inlet of the air manifold 1A, very well reflects the variation of water content of the water-absorbing material 30 disposed in the vicinity of the inlet of the air manifold 1A.

On the other hand, in the air manifold 1B into which cathode effluent is discharged, the water content of the water-absorbing material 30 surrounding the outlet of the air passages 32 rises early during the operation.

Then, the water content of the water-absorbing material 30 in the vicinity of the outlet of the air manifold 1B, rises with elapsed time. Therefore, the second hygrometer 9B disposed at the outlet of the air manifold 1B, very well reflects the variation of the water content of the water-absorbing material 30 in the vicinity the outlet of the air manifold 1B.

The change-over of air supply direction based on the humidity detected by the hygrometers 9A, 9B disposed in this way, has the following significance. Specifically, regarding humidification of the supplied air, the change-over of air supply direction depending on the water content of the part where the fall of the water content is earliest ensures that the air supplied to all the air passages 32 is always sufficiently humidified. Regarding the water absorption of the water-absorbing material 30, all of the water-absorbing capacity of the water-absorbing material 30 can be utilized by changing over the air supply direction based on the water content of the part where the rise of water content is slowest.

The controller 8 is a microcomputer comprising a central processing unit (CPU), read-only memory (ROM), random access memory (RAM) and input/output interface (I/O interface). The controller may also comprise plural microcomputers.

Next, referring to FIG. 5, the air supply direction change-over routine executed by the controller 8 will be described. This routine is executed at an interval of one second during the operation of the fuel cell stack 6.

First, in a step S1, the controller 8 reads the humidities detected by the hygrometers 9A, 9B. In a following step S2, it is determined whether or not the inlet humidity is less than a lower limiting humidity. Here, the inlet humidity refers to the humidity detected by the first hygrometer 9A regarding the first air supply direction shown in FIG. 1, and to the humidity detected by the second hygrometer 9B regarding the second air supply direction shown in FIG. 2. Likewise, the outlet humidity refers to the humidity detected by the second hygrometer 9B regarding the first air supply direction shown in FIG. 1, and to the humidity detected by the first hygrometer 9A regarding the second air supply direction shown in FIG. 2. The lower limiting humidity is preferably set by experiment or through computer simulation. In a typical case, it is set equal to thirty percent in terms of relative humidity.

When the inlet humidity is not less than the lower limiting humidity, in a step S3, the controller 8 determines whether or not the outlet humidity is higher than an upper limiting humidity. The upper limiting humidity is preferably set by experiment or through computer simulation. In a typical case, it is set equal to seventy percent in terms of relative humidity. When the outlet humidity is not higher than the upper limiting humidity, the controller 8 terminates the routine without operating the three-way valves 20-22.

When the inlet humidity is lower than the lower limiting humidity in the step S2, or when the outlet humidity is higher than the upper limiting humidity in the step S3, the controller 8 operates the three-way valves 20-22 in a step S4 to change over the air supply direction. After the processing of the step S4, the controller 8 terminates the routine.

Due to this routine, when the humidity detected by the first hygrometer 9A is lower than the lower limiting humidity with respect to the first air supply direction, or when the humidity detected by the second hygrometer 9B is lower than the lower limiting humidity with respect to the second air supply direction, the air supply direction is changed over. Also, when the humidity detected by the second hygrometer 9B is higher than the upper limiting humidity with respect to the first air supply direction, or when the humidity detected by the first hygrometer 9A is higher than the upper limiting humidity with respect to the second air supply direction, the air supply direction is changed over.

Due to the operation of the fuel cell stack 6, the water content of the water-absorbing material 30 situated in the vicinity of the outlet of the air passages 32 of the fuel cells rises, and the water content of the water-absorbing material 30 situated in the vicinity of the inlet of the air passages 32 falls. Due to the execution of this routine, when the water content of the water-absorbing material 30 in the vicinity of the outlet of the air passages 32 is excessive, or when the water content of the water-absorbing material 30 in the vicinity of the inlet of the air passages 32 has fallen to a level at which the air supplied from outside cannot be suitably humidified, the air supply direction is changed over. As a result, the air supplied from outside is humidified using the water-absorbing material 30 which has absorbed sufficient water from cathode effluent. In this way, the water produced by the power generation of the fuel cell stack 6 is efficiently utilized, and the membrane electrolyte 33 can always be maintained at a suitable water level.

When the air supply direction is changed over, in the fuel cells 36, the flow direction of the air passages 32 is reversed. The oxygen concentration of the air in the air passages 32 falls progressively further downstream due to the reaction of oxygen and hydrogen ions in the cathode 33B. As a result, the current density distribution and temperature distribution of the reaction surfaces of the fuel cells 6 develop a bias. This bias tends to decrease the power generating efficiency of the fuel cells 6, but reversal of the air supply direction to the air passages 32 contributes to eliminating this bias.

According to this embodiment, the air supply direction change-over was determined based on the inlet humidity and outlet humidity, but the air supply direction can of course be changed over based only on one of these humidities as a parameter.

Next, a second embodiment of this invention will be described referring to FIGS. 6-8.

Figure 6:
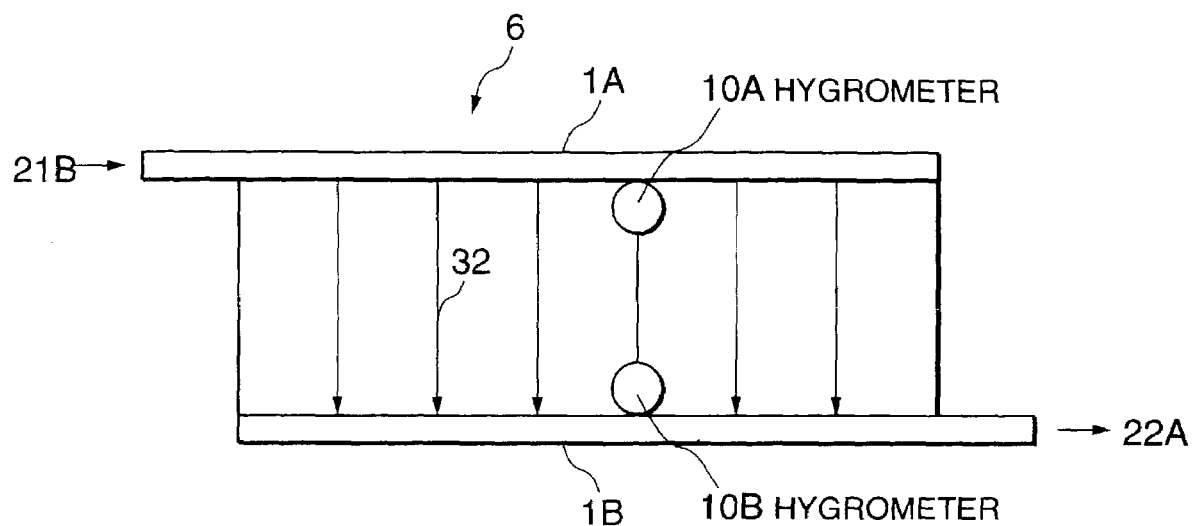
FIG. 6 is a schematic diagram of the essential parts of an air supply mechanism according to a second embodiment of this invention.

In this embodiment, a third hygrometer 10A and fourth hygrometer 10B disposed as shown in FIG. 6 are used instead of the first hygrometer 9A and second hygrometer 9B of the first embodiment, in order to obtain an index showing the humidity of the air distributed to the air passages 32. The third hygrometer 10A is disposed between the first air manifold 1A and the opening of the air passage 32 of the fuel cell 33 situated in the middle part of the fuel cell stack 6. The fourth hygrometer 10B is disposed between the opening on the opposite side of the same air passage 32 and the air manifold 1B. The remaining features of the hardware relating to the air supply mechanism are identical to those of the first embodiment.

Figure 7:
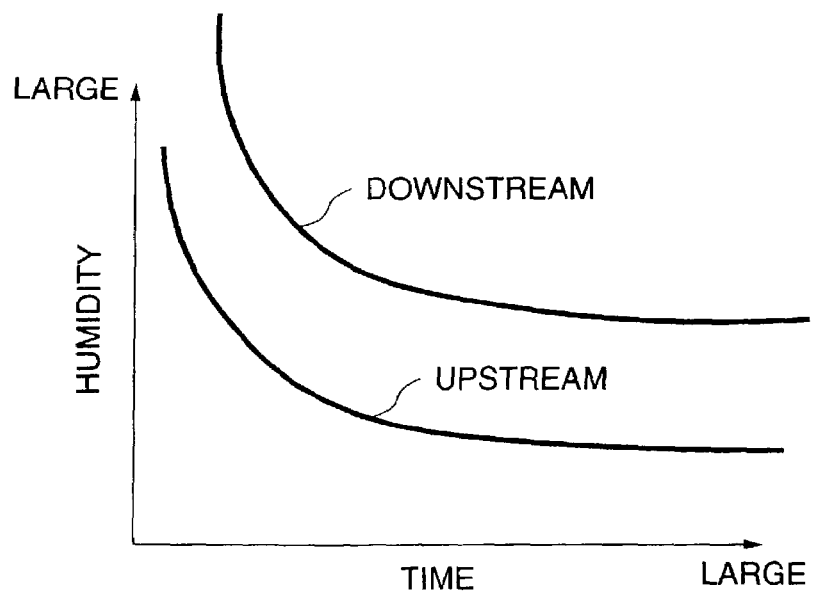
FIG. 7 is a timing chart describing the variation of humidity sensor measurement values according to the second embodiment of this invention.

The humidity characteristics detected by the hygrometers 10A, 10B when the fuel cell stack 6 is operated are shown in FIG. 7. The lower curve in this diagram represents the humidity detected by a hygrometer situated upstream of the air passage 32. The upper curve represents the humidity detected by a hygrometer situated downstream of the air passage 32. Air which has been humidified by the water-absorbing material 30 is supplied from the air passage 32 to the cathode 33B. At the cathode 33B, water vapor is produced by reaction of oxygen contained in the air with hydrogen ions which have passed through the membrane electrolyte 33. Part of this water vapor humidifies the electrolyte 33, and the remaining water vapor is discharged from the air passage 32 as cathode effluent together with the residual air components after oxygen is consumed. Therefore, compared to the humidity of the air flowing into the air passage 32, the humidity of the cathode effluent flowing out from the air passage 32 is always high.

When humidification of the air supplied from outside continues due to the water-absorbing material 30, the water content of the water-absorbing material 30 decreases with the elapsed time, and the humidity detected by the hygrometers 10A, 10B also decreases. The timing of this decrease depends on the location of the air passage 32 that was selected for the installation of the hygrometers 10A, 10B. According to this embodiment, the hygrometers 10A, 10B are installed in the air passage 32 situated in the middle of the fuel cell stack 6, so an average water content of the water-absorbing material which performs humidification, or in other words the average humidity of a large number of the air passages 32, can be obtained.

In order to obtain a better appreciation of the humidity of the air passages 32, it is preferred to instal a single hygrometer inside the air passage 32 instead of installing the hygrometers 10A, 10B in this way. However, as the installation of a hygrometer inside the air passage 32 facing the cathode 33A may decrease the power generation efficiency of the fuel cell 36, according to this embodiment, the hygrometers 10A, 10B are respectively disposed between the air passage 32 and air manifolds 1A, 1B.

Figure 8:
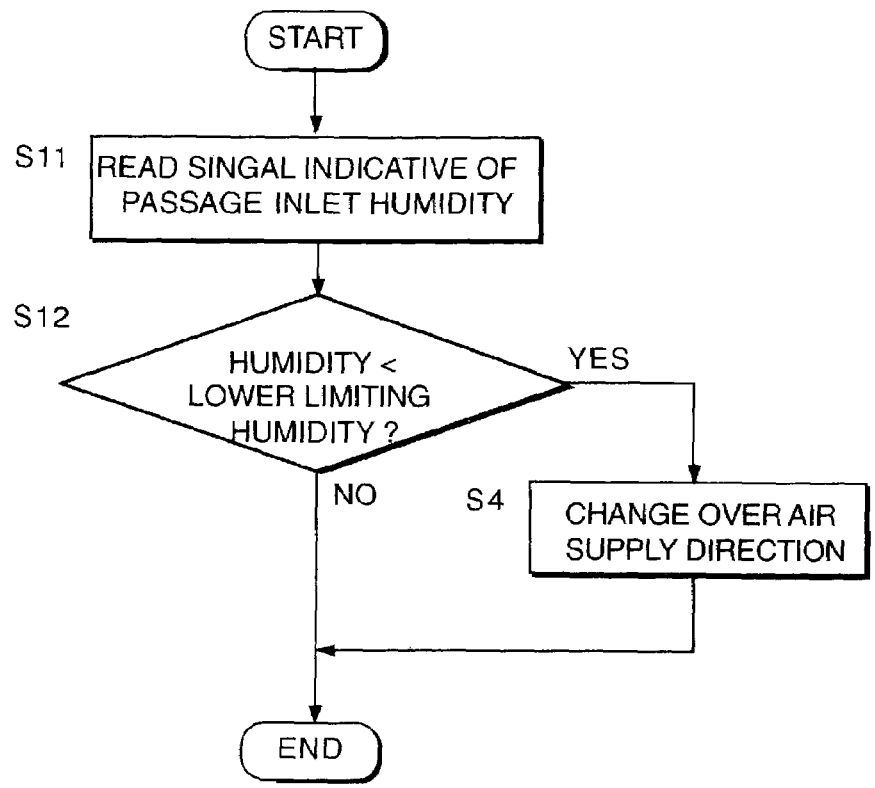
FIG. 8 is a flowchart describing an air supply direction change-over routine executed by a controller according to the second embodiment of this invention.
Figure 9:
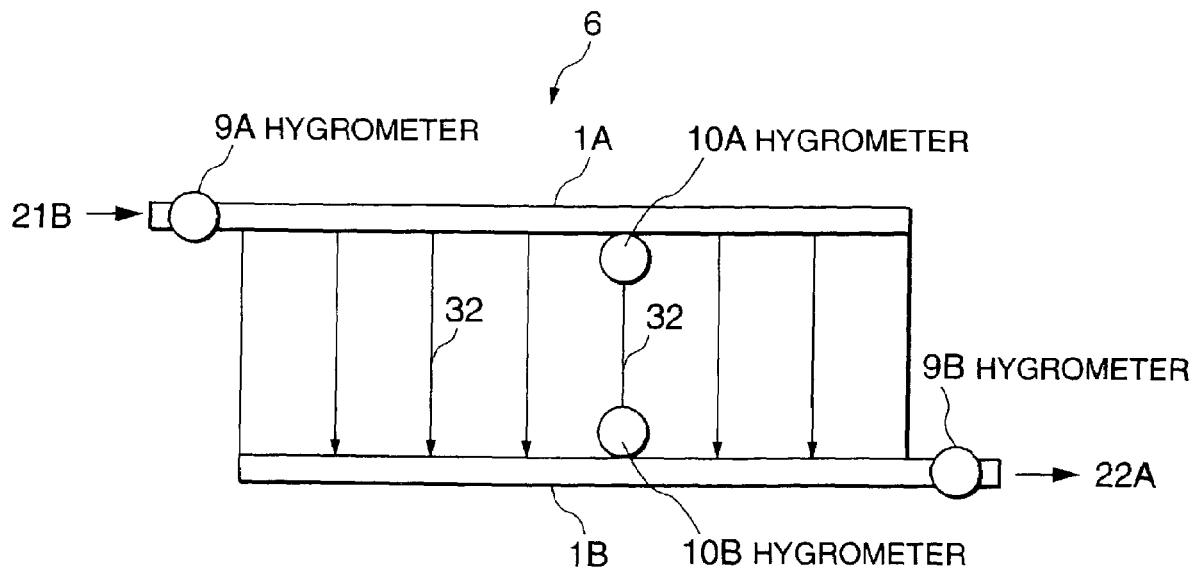
FIG. 9 is a schematic diagram of the essential parts of an air supply mechanism according to a third embodiment of this invention.

The controller executes the air supply direction change-over routine shown in FIG. 8 using the humidity detected by the third hygrometer 10A and fourth hygrometer 10B disposed in this way. This routine is also executed at an interval of one second during the operation of the fuel cell stack 6.

First, in a step S11, the controller 8 reads the humidity detected by one of the hygrometers 10A, 10B which is situated upstream with respect to the air flow. The value read here is the humidity corresponding to the lower curve of FIG. 7.

In a following step S12, it is determined whether or not the read humidity is less than a lower limiting humidity. Herein, the lower limiting humidity is preferably set by experiment or through computer simulation. In a typical case, it is set equal to forty percent in terms of relative humidity. When the read humidity is less than the lower limiting humidity in the step S4, the three-way valves 20-22 are operated to change over the air supply direction. After the processing of the step S4, the controller 8 terminates the routine. Also, if the read humidity is not less than the lower limiting humidity the controller 8 terminates the routine immediately without performing the processing of the step S4.

Due to this routine, the air supply direction is changed over when the humidity detected by the third hygrometer 10A is less than the lower limiting humidity when the first air supply direction is applied, and when the humidity detected by the fourth hygrometer 10A is less than the lower limiting humidity when the second air supply direction is applied. In other words, the air supply direction is changed over each time the upstream humidity falls below the lower limiting humidity.

Next, a third embodiment of this invention will be described referring to FIGS. 9-12.

According to this embodiment, in order to obtain an index showing the humidity of the air supplied to the air passages 32, the first hygrometer 9A and second hygrometer 9B of the first embodiment are used in conjunction with the third hygrometer 10A and fourth hygrometer 10B of the second embodiment. The remaining features of the hardware construction relating to the air supply mechanism, are identical to those of the first embodiment.

Figure 10:
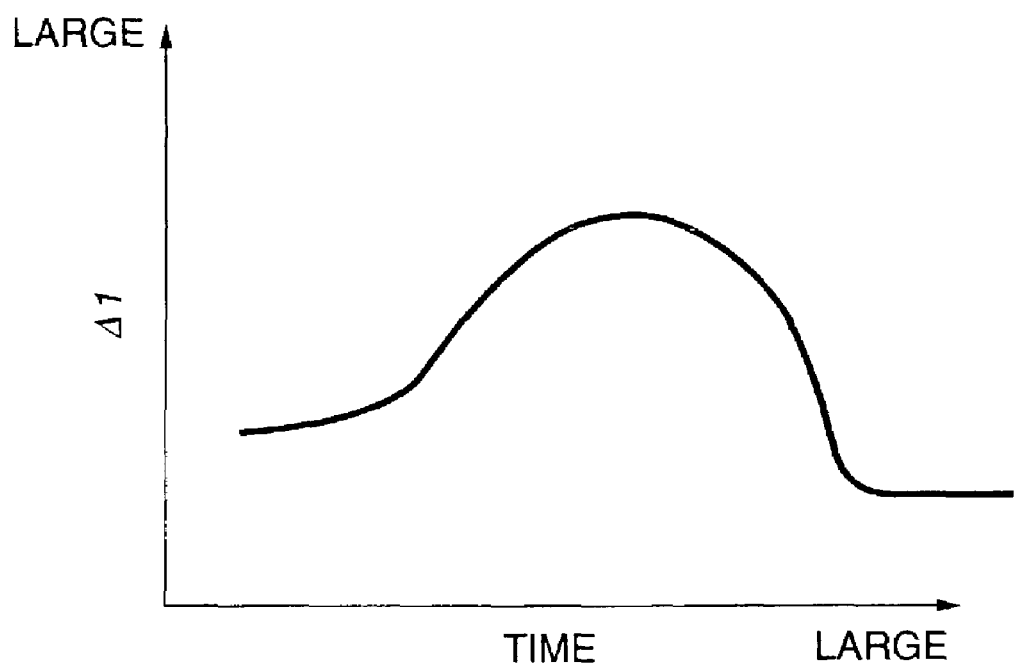
FIG. 10 is a timing chart describing the variation of a difference $\Delta 1$ in the humidity detected by two upstream hygrometers according to the third embodiment of this invention.
Figure 11:
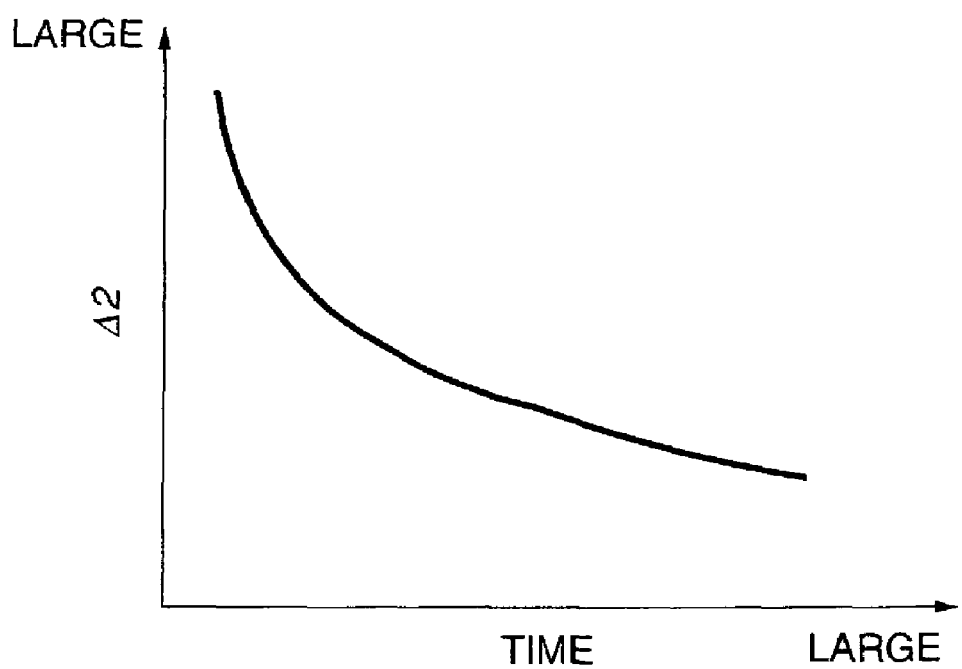
FIG. 11 is a timing chart describing the variation of a difference $\Delta 2$ in the humidity detected by two downstream hygrometers according to the third embodiment of this invention.

In this embodiment, the difference between the humidities detected by the two hygrometers 9A, 10A (9B, 10B) situated upstream of the air flow, is shown in FIG. 10. Likewise, the difference between the humidities detected by the two hygrometers 9B, 10B (9A, 10A) situated downstream of the air flow, is shown in FIG. 11. In the following description, it is assumed that air is supplied to the fuel cell stack 6 depending on the first air flow direction, the hygrometers 9A, 10A are upstream hygrometers, and the hygrometers 9B, 10B are downstream hygrometers.

Referring to FIG. 10, the water content of the water-absorbing material 30 in the vicinity of the inlet of the air manifold 1A first decreases due to the air supply, and the humidity detected by the first hygrometer 9A therefore decreases. At this time, as well-humidified air is supplied to the air passages 32, the humidity detected by the third hygrometer is high. Therefore, after changing over the air supply direction, the difference Δ1 between the humidities detected by the hygrometers 9A, 10A increases.

When the water content of the water-absorbing material 30 of the air manifold 1A decreases overall with the elapsed time, the humidity detected by the third hygrometer 10A decreases. On the other hand, the water content of the water-absorbing material in the vicinity of the inlet of the air manifold 1A has already decreased to a constant level, so it does not fluctuate much at this stage. As a result, the difference Δ1 between the humidities detected by the hygrometers 9A, 10A starts to decrease. When the water content of the water-absorbing material 30 further decreases, this difference Δ1 effectively becomes constant.

Therefore, if the air supply direction is changed over when the difference between the humidities detected by the upstream hygrometers 9A, 10A starts to decrease, the humidity of the air distributed to all the air passages 32 can always be maintained at the proper level.

Referring to FIG. 11, the difference Δ2 between the humidities detected by the downstream hygrometers 9B, 10B decreases together with the elapsed time from when the air supply direction was changed over. Due to the production of water vapor at the cathode 33B, the humidity detected by the second hygrometer 9B is effectively constant. On the other hand, when the water content of the water-containing material 30 in the air manifold 1B rises, the discharged water increases without being absorbed by the water-containing material 30, and consequently the humidity of the fourth hygrometer 10B rises.

Therefore, if the air supply direction is changed over when the difference Δ2 of the humidities detected by the downstream hygrometers 9B, 10B becomes less than the lower limiting value, the water vapor discharged to the atmosphere from the air manifold 1B can be reduced, and the recovery of water vapor in the cathode effluent can be enhanced. The lower limiting value is preferably set by experiment or through computer simulation. In a typical case, the lower limiting value is set to ten percent of the average of the detected values by the hygrometers 9B and 10B.

Figure 5:
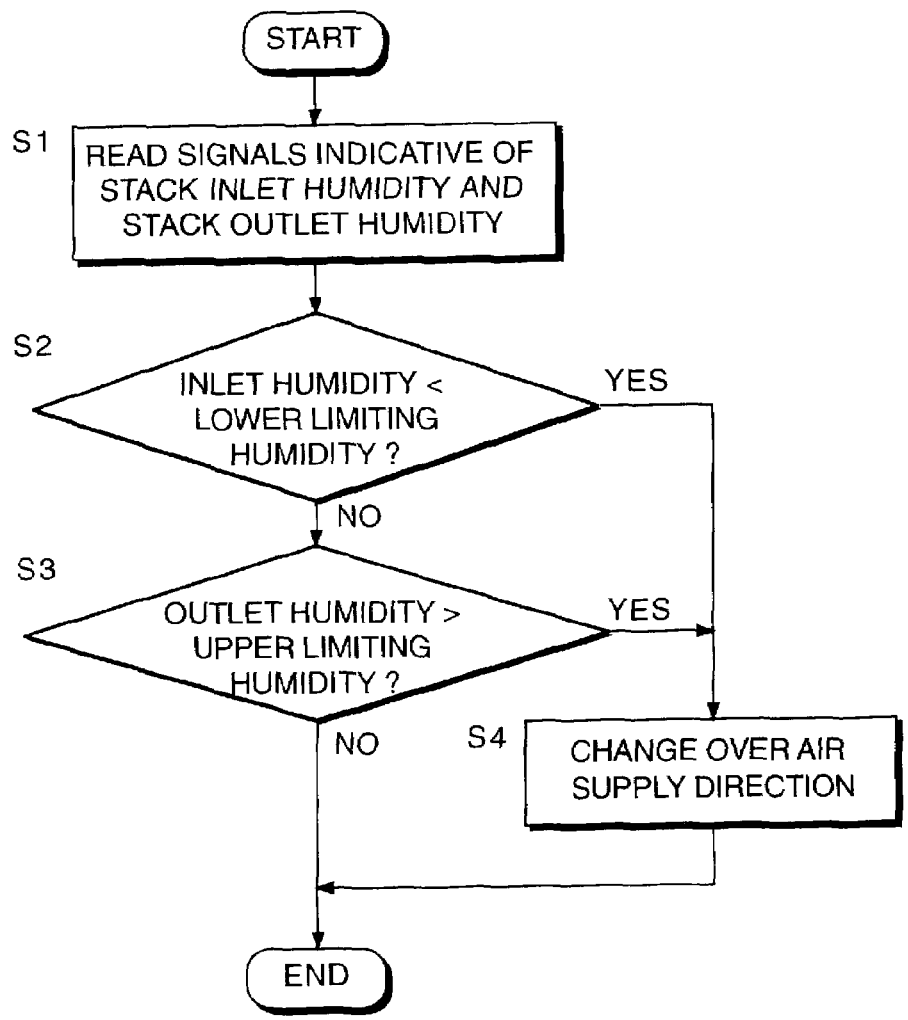
FIG. 5 is a flowchart describing an air supply direction change-over routine executed by a controller according to the first embodiment of this invention.
Figure 12:
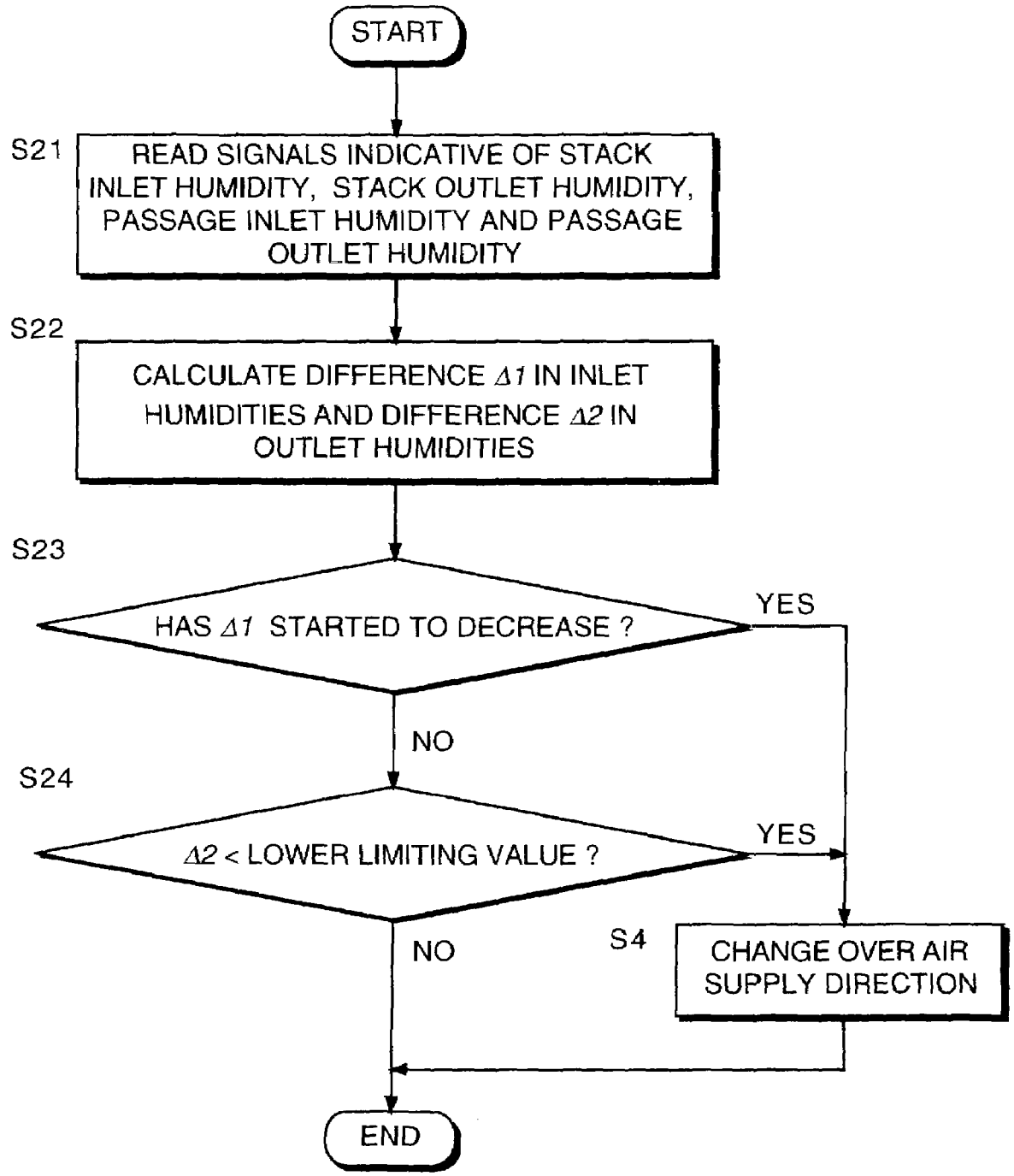
FIG. 12 is a flowchart describing an air supply direction change-over routine executed by the controller according to the third embodiment of this invention.

To perform this control, the controller 8 executes the routine shown in FIG. 12 instead of the routine shown in FIG. 5 of the first embodiment.

First, in a step S21, the controller reads the humidities detected by the hygrometers 9A, 9B and hygrometers 10A, 10B.

In a following step S22, the controller 8 calculates a difference Δ1 between the humidities detected by the two upstream hygrometers 9A, 10A (9B, 10B) as a first parameter, and calculates a difference Δ2 between the humidities detected by the two downstream hygrometers 9B, 10B (9A, 10A) as a second parameter.

In a next step S23, the controller 8 determines whether or not the difference Δ1 has started to decrease. If the difference Δ1 has not started to decrease, in a step S24, it is determined whether or not the difference Δ2 has fallen to less than the lower limiting value.

If the difference Δ1 has started to decrease in the step S22, or if the difference Δ2 has fallen below the lower limiting value in the step S23, the controller 8 changes over the air supply direction by operating the three-way valves 20-22 in the step S4. After the processing of the step S4, the controller 8 terminates the routine.

If the difference Δ2 is not less than the lower limiting value in the step S24, the controller 8 terminates the routine immediately without performing the processing of the step S4.

Due to this routine, when the first air supply direction is applied, the air supply direction is changed over to the second air supply direction at the earlier of the timings when the first parameter Δ1 starts to decrease after increasing, and when the second parameter Δ2 falls below the lower limiting value. When the second air supply direction is applied, the air supply direction is changed over to the first air supply direction at the earlier of the timings when the second parameter Δ2 starts to decrease after increasing, and when the first parameter Δ1 falls below the lower limiting value.

In this embodiment, the humidification states of the electrolyte 33 and the water absorption state of the water-absorbing material 30, can be correctly reflected in the change-over of the air supply direction.

Next, a fourth embodiment of this invention will be described referring to FIGS. 13-16.

Figure 13:
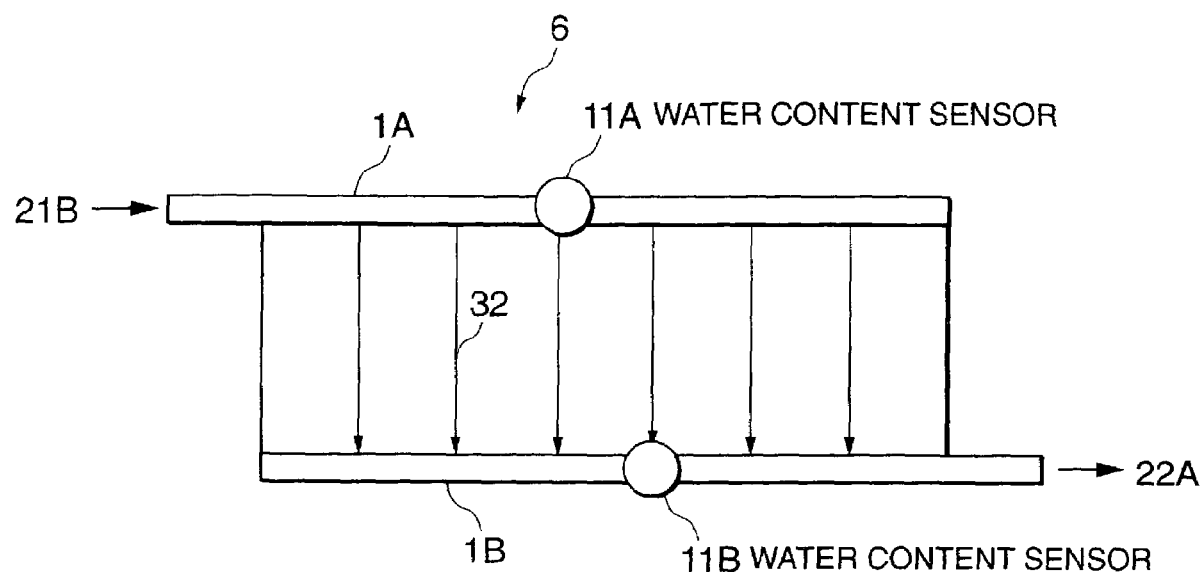
FIG. 13 is a schematic diagram of the essential parts of an air supply mechanism according to a fourth embodiment of this invention.

Referring to FIG. 13, according to this embodiment, a first water content sensor 11A and second water content sensor 11B are used instead of the first hygrometer 9A and second hygrometer 9B of the first embodiment to obtain an index representing the humidification of the air distributed to the air passages 32. The first water content sensor 11A is installed on the wall surface of an intermediate part of the air manifold 1A. The second water content sensor 11B is installed on the wall surface of an intermediate part of the air manifold 1B. Unlike the hygrometers 10A, 10B of the second embodiment, the water content sensors 11A, 11B do not have to face the air passages 32. The remaining features of the hardware relating to the air supply mechanism are identical to those of the first embodiment.

Figure 15:
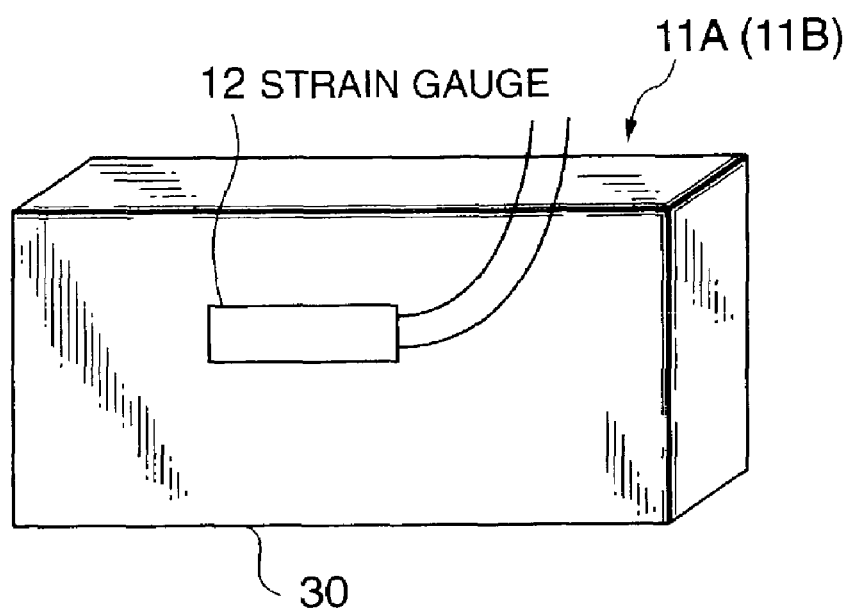
FIG. 15 is a perspective view of the water content sensor according to the fourth embodiment of this invention.

Referring to FIG. 15, the water content sensors 11A, 11B comprise a strain gauge 12 stretched over the surface of the water-absorbing body 30 which covers the inner circumference of the air manifolds 1A, 1B. The water-absorbing body 30 is formed of a material which expands according to the water content.

Figure 16:
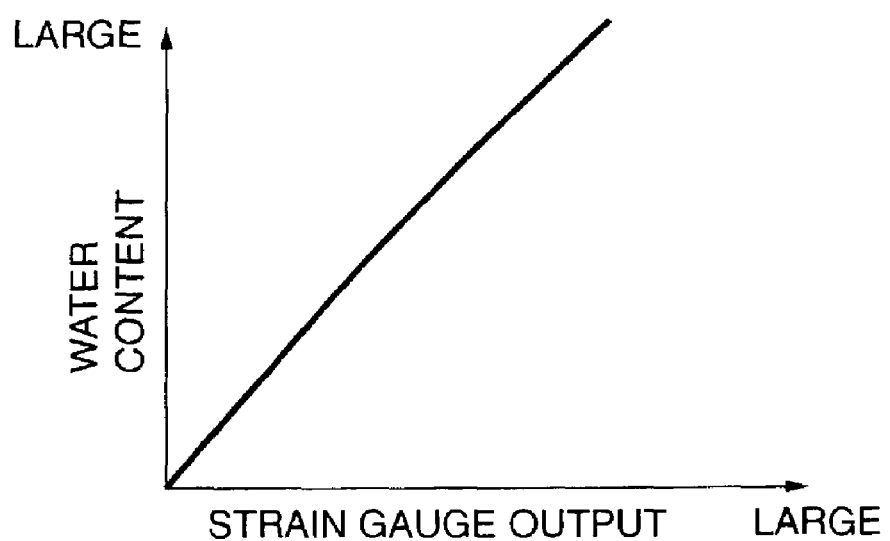
FIG. 16 is a diagram describing the relation between the output of the water content sensor and the water content of a water-absorbing material.

In this case, the relation between the water content of the water-absorbing body 30 and the deformation of the water-absorbing body 30 detected by the strain gauge 12 as shown in FIG. 16, is first found by experiment. A map specifying this relation is prestored in the memory of the controller 8, and the controller 8 converts the detected deformation to a water content by looking up the map. Due to this arrangement, the detection of deformation amount becomes the detection of water content.

Figure 14:
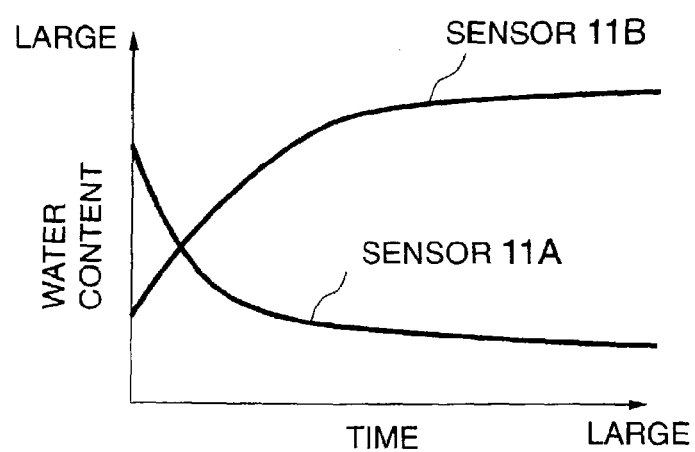
FIG. 14 is a timing chart describing the variation of a water content detected by two water content sensors according to the fourth embodiment of this invention.

FIG. 14 shows the variation of the water content detected by the water content sensors 11A, 11B with elapsed time after the air supply direction has been changed over from the second air supply direction to the first air supply direction during operation of the fuel cell stack 6. The water-absorbing material 30 in the air manifold 1A to which air is supplied from outside, humidifies the supplied air so that its water content decreases with the elapsed time. On the other hand, the water-absorbing material 30 in the air manifold 1B into which cathode effluent containing water vapor is discharged, absorbs water vapor in the cathode effluent so that its water content increases with the elapsed time.

The controller 8 changes over the air supply direction by operating the three-way valves 20-22 when the water content detected by the water content sensor 11A(11B) situated upstream is less than a lower limiting value, or the water content detected by the water content sensor 11B(11A) situated downstream is more than an upper limiting value. The air supply direction change-over routine executed by the controller 8 for this purpose is substantially identical to the routine of FIG. 5 of the first embodiment.

However, in the step S1, the water content detected by the water content sensors 11A, 11B is read, in the step S2, the water content of the water-absorbing material 30 of the air manifold 1A(1B) which is upstream of the air flow is compared with a lower limiting value, and in the step S3, the water content of the water-absorbing material 30 of the downstream air manifold 1B(1A) is compared with an upper limiting value. The lower limiting value and the upper limiting value are preferably set by experiment or through computer simulation. In a typical case, however, the lower limiting value is set to twenty percent of the saturated state, and the upper limiting value is set to eighty percent of the saturated state.

In the first-third embodiments, an index humidity showing the humidity of the air distributed to the air passages 32 was used, but the water content may also be used as in this embodiment.

Next, a fifth embodiment of this invention relating to the structure of the water content sensor will be described referring to FIG. 17.

Figure 17:
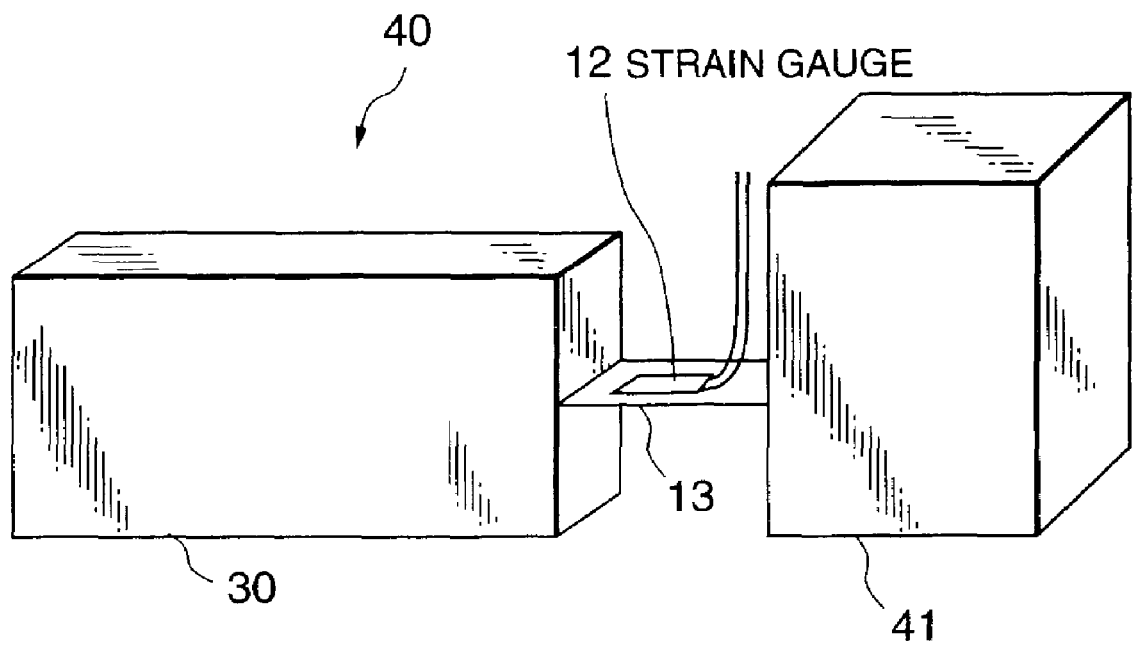
FIG. 17 is a perspective view of a water content sensor according to a fifth embodiment of this invention.

In this embodiment, water content sensors 40 shown in FIG. 17 are respectively used instead of the water content sensors 11A(11B) of the fourth embodiment. The remaining features of the air supply mechanism are identical to those of the fourth embodiment.

Referring to FIG. 17, part of the water-absorbing material 30 which covers the inner circumference of the air manifold 11A(11B) is supported at an end by a plate-shaped elastic member 13 fixed to a wall surface 41 of the air manifold 11A(11B). The strain gauge 12 is stretched by this elastic member 13.

The weight of the water-absorbing material 30 increases as the water content of the water-absorbing material 30 increases, so the bending of the elastic member 13 increases. The strain gauge 12 outputs a signal according to this bending. The output of the strain gauge 12 and the water content have an identical relation to that shown in FIG. 16 of the fourth embodiment. In this case also, the relation between the water content of the water-absorbing material 30 and the output of the strain gauge 12 is first found by experiment. A map specifying this relationship is prestored in the memory of the controller 8, and the controller 8 converts the detected deformation to the water content by looking up this map.

Next, a sixth embodiment relating to the construction of the water content sensor will be described referring to FIGS. 18, 19.

Figure 18:
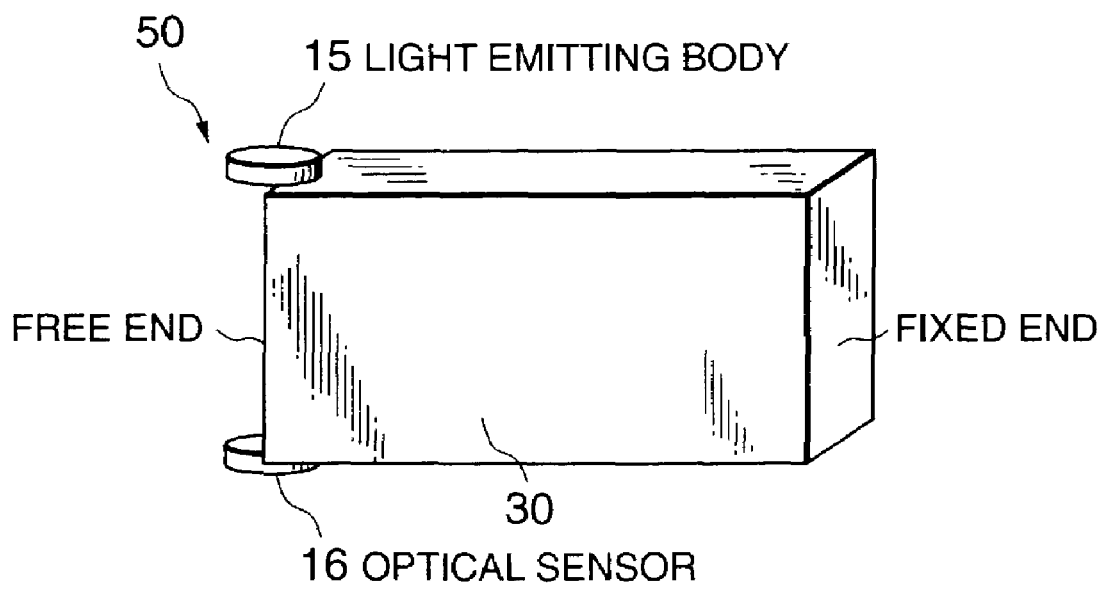
FIG. 18 is a perspective view of a water content sensor according to a sixth embodiment of this invention.

According to this embodiment, water content sensors 50 shown in FIG. 18 are respectively used instead of the water content sensor 11A(11B) of the fourth embodiment. The remaining features of the construction relating to the air supply mechanism are identical to those of the fourth embodiment.

Referring to FIG. 18, the water content sensor 50 comprises a light-emitting body 15 and optical sensor 16 which straddle one end of the water-absorbing material 30 from both sides. The other end of the water-absorbing material 30 is fixed to the wall surface of the air manifold 1A(1B). The positions of the light-emitting body 15 and optical sensor 16 are set so that part of the light from the light-emitting body 15 received by the optical sensor 16 is blocked by the water-absorbing material 30. The optical sensor 16 inputs a signal according to the received light amount to the controller 8.

Figure 19:
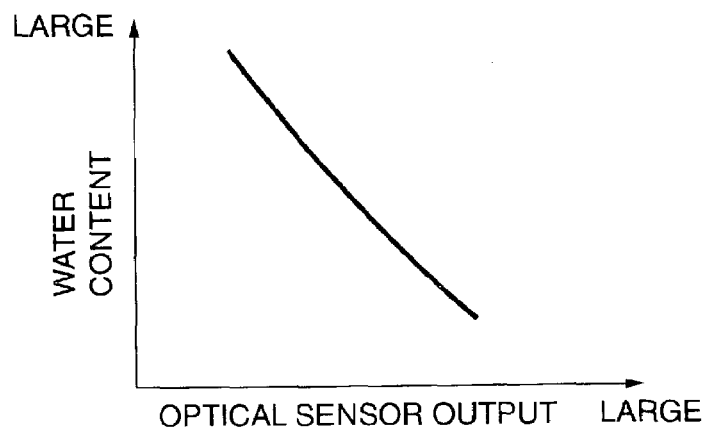
FIG. 19 is a diagram describing the relation between the output of an optical sensor applied to a water content sensor, and the water content sensor.

When the water content of the water-absorbing material 30 increases, the water-absorbing material 30 expands, the light amount emitted by the light-emitting body 15 which is blocked by the water-absorbing material 30 increases, the light amount received by the optical sensor 16 decreases, and the output of the optical sensor 16 also decreases, as shown in FIG. 19.

This relation is first found by experiment. A map specifying this relation is prestored in the memory of the controller 8, and the controller 8 converts the output of the optical sensor 16 to a water content by looking up this map.

Next, a seventh embodiment of this invention will be described referring to FIGS. 20, 21.

In this embodiment, the output voltages of the fuel cell stack 6 or the single fuel cells 36 are used as an index showing the humidification of the air distributed to the air passages 32.

Figure 20:
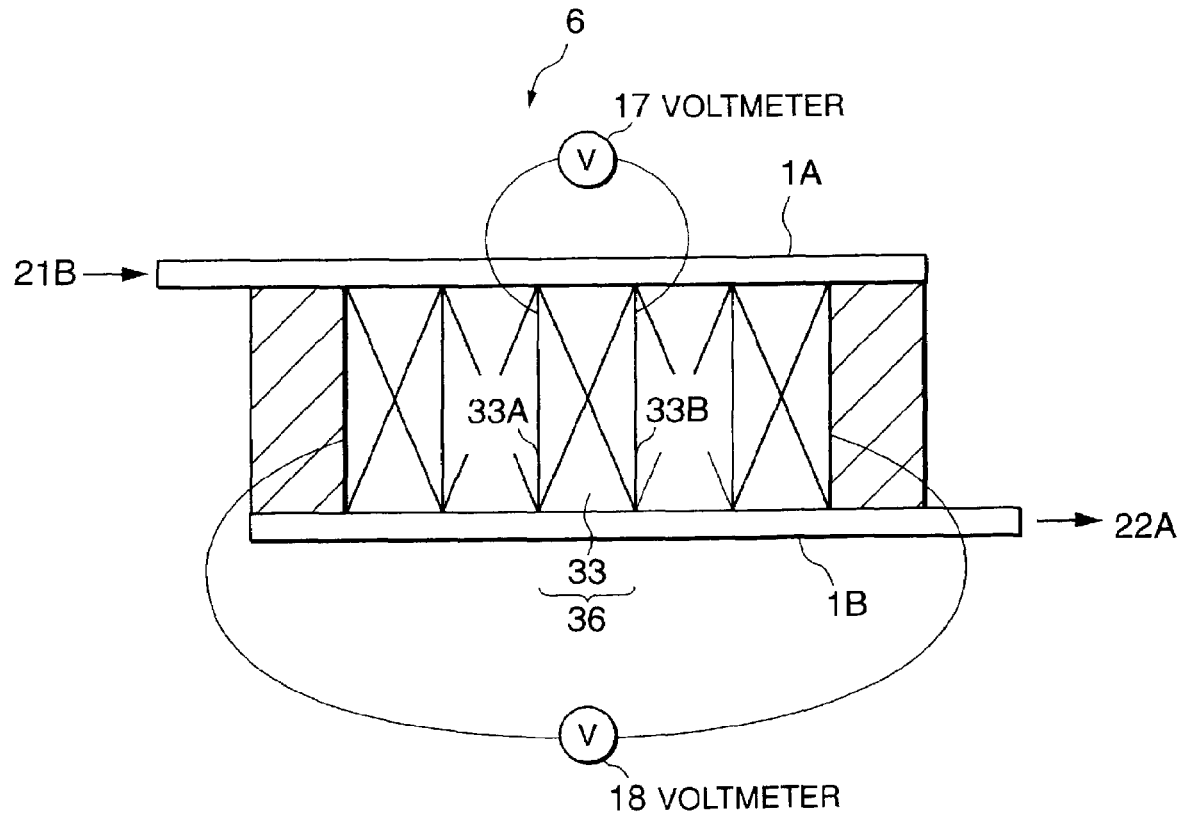
FIG. 20 is a schematic diagram of a fuel cell stack according to a seventh embodiment of this invention.

For this purpose, a voltmeter 17 which detects the potential difference between the anode 33A and cathode 33B of the single fuel cell 36, or a voltmeter 18 which detects the output voltage of the fuel cell stack 6, is installed instead of the hygrometers 9A, 9B of the first embodiment as shown in FIG. 20. The remaining features of the construction of the air supply mechanism are identical to those of the first embodiment.

Figure 21:
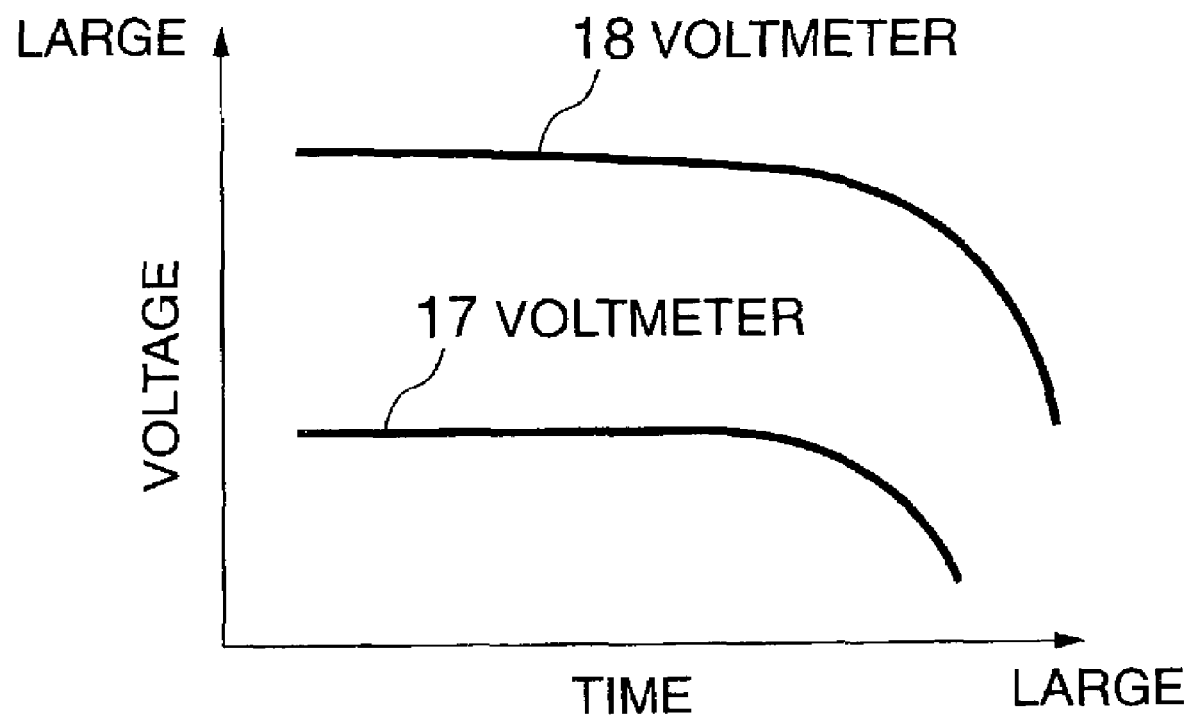
FIG. 21 is a timing chart describing the variation of the output voltage of a voltmeter according to the seventh embodiment of this invention.

The output voltage from the voltmeter 17, 18 after the air supply direction is changed over, vary in a similar pattern with the elapsed time, as shown in FIG. 21. Specifically, when the water content of the water-absorbing material 30 decreases, the humidity of the air in the air passages 32 supplied to the cathode 33A decreases. As a result, the electrolyte 33 dries, while the output voltage of the voltmeter 17 and the output voltage of the voltmeter 18 decrease. Therefore, the output voltage of the voltmeter 17 or voltmeter 18 may be considered as indices showing the humidification of the air in the air passages 32.

The controller 8 compares the output voltage of the voltmeter 17 or voltmeter 18 with a lower limiting voltage, and when the output voltage becomes less than the lower limiting voltage, the three-way valves 20-22 are operated to change over the air supply direction. It is possible to provide only one of the voltmeters 17, 18. The lower limiting humidity is preferably set by experiment or through computer simulation. In a typical case, the lower limiting voltage is set to seventy percent of the output voltage immediately after the change-over of the air supply direction.

According to this embodiment, an index representing water content can be detected and the air supply direction can be changed over without depending on hygrometers or water content sensors.

The contents of Tokugan 2002-38043, with a filing date of Feb. 15, 2002 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

For example, in the aforesaid embodiments, the change-over of the air supply direction was performed by controlling the three-way valves 20-22, but the change-over of the air supply direction may also be performed by a pump or fan without using the three-way valves 20-22. However, the use of the three-way valves 20-22 to change over the air supply direction is advantageous from a cost viewpoint.

In the aforesaid embodiments, this invention was applied to an air supply mechanism, but the invention may also be applied to a hydrogen supply mechanism. Specifically, the water contained in anode effluent is absorbed by an absorbing material disposed in the hydrogen manifold on the discharge side. When the water content of the absorbing material reaches an upper limit, the hydrogen supply direction is changed over so that the supply hydrogen is humidified using the water-absorbing material of high water content. Whereas water vapor is produced by reaction between oxygen and hydrogen ions at the cathode 33B, water vapor is basically not produced at the anode 33A. The use of the water vapor produced for humidification of the membrane electrolyte is very effective when this invention is applied to the air supply mechanism.

The embodiments of this invention in which an exclusive property or privilege is claimed are defined as follows:

What is claimed is:

1. A fuel cell power plant, comprising:
    a fuel cell stack wherein plural fuel cells are stacked in series, each of the fuel cells comprising a membrane electrolyte, an electrode in contact with the membrane electrolyte, and gas passages formed facing the electrode, the power plant generating power by a chemical reaction of a gas flowing in the gas passages at the electrode;
    a first manifold communicating with an end of each of the gas passages, the first manifold comprising a water-absorbing material facing a flow of the gas; and
    a second manifold communicating with the other end of each of the gas passages, the second manifold comprising a water-absorbing material facing a flow of the gas; and
    a gas supply mechanism for selectively changing over between a first gas supply direction wherein the gas is made to flow from the first manifold to the second manifold via the gas passages, and a second gas supply direction wherein the gas is made to flow from the second manifold to the first manifold via the gas passages, so as to supply the gas to the fuel cells;
    a first hygrometer installed upstream of the water-absorbing material of the first manifold with respect to the first gas supply direction;
    a second hygrometer installed downstream of the water-absorbing material of the second manifold with respect to the first gas supply direction;
    a third hygrometer installed in a communicating part between one of the gas passages and the first manifold;
    a fourth hygrometer installed in a communicating part between the one of the gas passages and the second manifold; and
    a programmable controller programmed to:
        calculate a difference between a humidity detected by the first hygrometer and a humidity detected by the third hygrometer as a first parameter;
        calculate a difference between a humidity detected by the second hygrometer and a humidity detected by the fourth hygrometer as a second parameter; and
        control the gas supply mechanism to change over the gas supply direction, when the first gas supply direction is applied, to the second gas supply direction at the earlier of a timing when the first parameter starts to decrease after increasing, and a timing when the second parameter becomes less than a lower limiting value, and when the second gas supply direction is applied, to the first gas supply direction at the earlier of a timing when the second parameter starts to decrease after increasing, and a timing when the first parameter becomes less than the lower limiting value.

2. The fuel cell power plant as defined in claim 1, wherein the gas is air, the electrode is a cathode, and the chemical reaction is a water vapor-producing reaction between hydrogen ions which have passed through the membrane electrolyte and oxygen in the air.

3. The fuel cell power plant as defined in claim 1, wherein the gas supply mechanism comprises plural three-way valves.

4. A gas supply direction control method for a fuel cell power plant, the power plant comprising a fuel cell stack wherein plural fuel cells are stacked in series, each of the fuel cells comprising a membrane electrolyte, an electrode in contact with the membrane electrolyte, and gas passages formed facing the electrode, the power plant generating power by a chemical reaction of a gas flowing in the gas passage passages at the electrode, a first manifold communicating with an end of each of the gas passages, the first manifold comprising a water-absorbing material facing a flow of the gas, a second manifold communicating with the other end of each of the gas passages, the second manifold comprising a water-absorbing material facing a flow of the gas, and a gas supply mechanism for selectively changing over between a first gas supply direction wherein the gas is made to flow from the first manifold to the second manifold via the gas passages, and a second gas supply direction wherein the gas is made to flow from the second manifold to the first manifold via the gas passages, so as to supply the gas to the fuel cells, the method comprising:
    determining a first humidity in the first manifold upstream of the water-absorbing material with respect to the first gas supply direction;
    determining a second humidity in the second manifold downstream of the water-absorbing material with respect to the first gas supply direction;

determining a third humidity in a communicating part between a specified gas passage one of the gas passages and the first manifold;

determining a fourth humidity in a communicating part between the one of the gas passages and the second manifold;

calculating a difference between the first humidity and the third humidity as a first parameter;

calculating a difference between the second humidity and the fourth humidity as a second parameter; and controlling the gas supply mechanism to change over the gas supply direction, when the first gas supply direction is applied, to the second gas supply direction at the earlier of a timing when the first parameter starts to decrease after increasing, and a timing when the second parameter becomes less than a lower limiting value, and when the second gas supply direction is applied, to the first gas supply direction at the earlier of a timing when the second parameter starts to decrease after increasing, and a timing when the first parameter becomes less than the lower limiting value.

* * * * *